P. MUELLER & A. C. SCHUERMANN.
APPARATUS FOR ATTACHING COUPLING NUTS TO PIPE FITTINGS.
APPLICATION FILED MAR. 28, 1911.
1,018,207.
Patented Feb. 20, 1912.
2 SHEETS—SHEET 1.
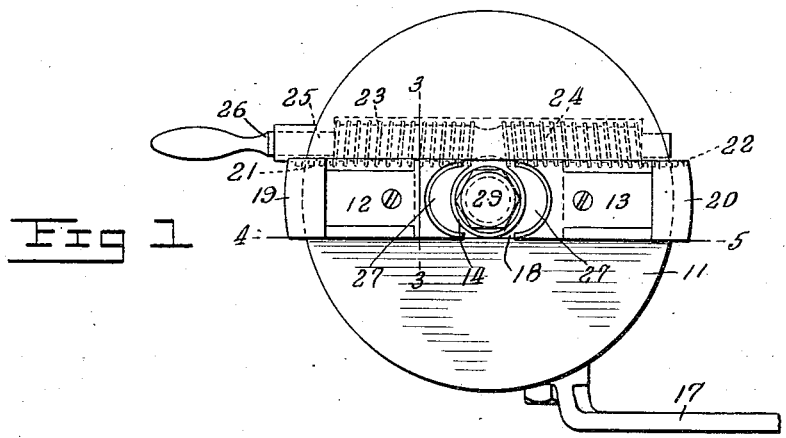
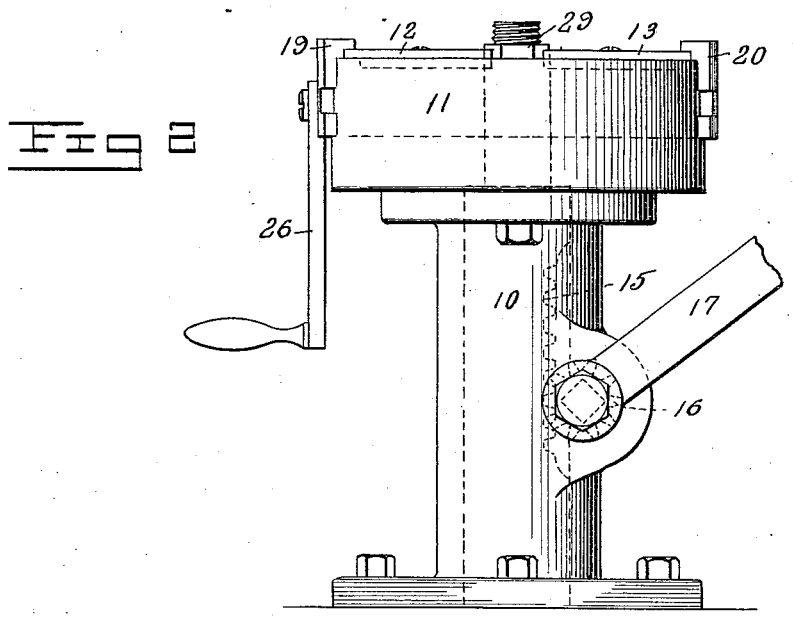
Inventors
Philip Mueller
Anton C. Schuermann

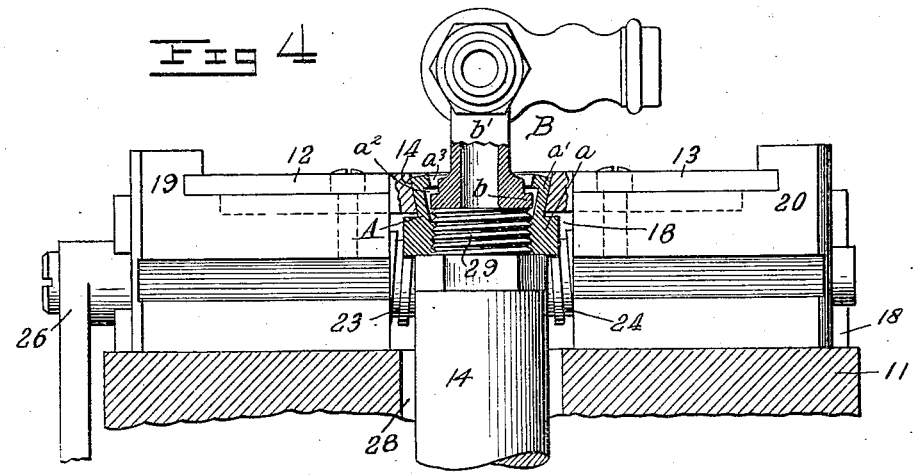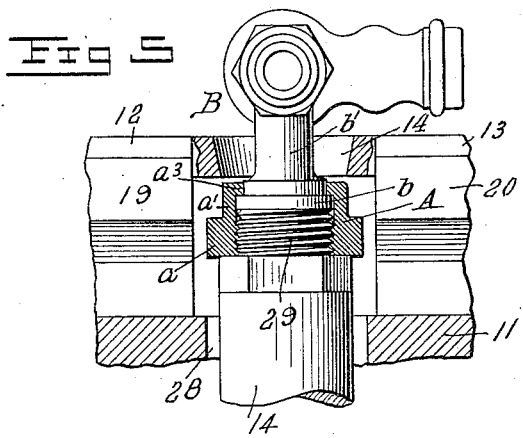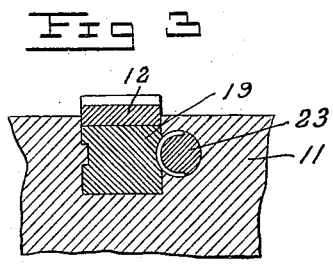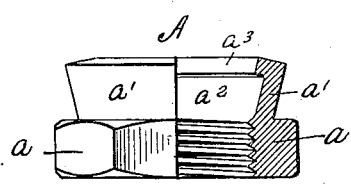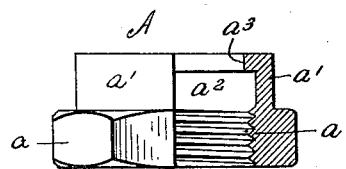

UNITED STATES PATENT OFFICE.

PHILIP MUELLER AND ANTON C. SCHUERMANN, OF DECATUR, ILLINOIS, ASSIGNORS TO H. MUELLER MANUFACTURING COMPANY, OF DECATUR, ILLINOIS, A CORPORATION OF ILLINOIS.

APPARATUS FOR ATTACHING COUPLING-NUTS TO PIPE-FITTINGS.

1,018,207. Specification of Letters Patent. Patented Feb. 20, 1912.

Application filed March 28, 1911. Serial No. 617,473.

*To all whom it may concern:*

Be it known that we, PHILIP MUELLER and ANTON C. SCHUERMANN, citizens of the United States, residing at Decatur, in the county of Macon and State of Illinois, have invented new and useful Improvements in Apparatus for Attaching Coupling-Nuts to Pipe-Fittings, of which the following is a specification.

This invention relates to an apparatus for attaching or securing coupling nuts for union joints on pipes, faucets and other fittings.

The object of the invention is to apply to the stem of the desired fitting formed with a collar or circumferential flange, a coupling nut capable of free rotation on said stem and be retained thereon by said collar or flange which latter also serves as an abutment or stop for said coupling nut when the latter is screwed on a coöperating member for completing a connection.

In this invention the chambered end of a swivel or coupling nut is acted on to secure it to a fitting, said end of the nut being initially expanded to pass over the collar or flange on said fitting and then compressed around the same to prevent the parts from separating, as hereinafter described in detail and illustrated in the accompanying drawings, the particular features of novelty being pointed out in the appended claims.

Referring to the drawings:—Figure 1 is a top plan view of one form of apparatus capable of carrying out the invention; Fig. 2, a side elevation of the same; Fig. 3, a vertical sectional view on the line 3—3 of Fig. 1; Figs. 4 and 5, like vertical sectional views, enlarged, on the line 4—5 of Fig. 1, and Figs. 6 and 7, detail views of the coupling nut previous to and after being operated on, respectively.

In the drawings in which like reference characters are used to indicate the same parts in all the figures, 10 refers to a hollow upright columnar support flanged at its lower end to receive securing bolts for holding said support in fixed and rigid position, and flanged at its upper end to form a seat for a preferably circular head 11 in which are mounted the compressing dies 12, 13. Slidable within the columnar support 10 is a traveler 14 on one side of which is a rack 15 operatively engaged with a pinion 16 mounted to turn in the support 10 when a lever 17 or other means on the shaft of the pinion is moved by a suitable power. The movement of the pinion in one direction or the other raises or lowers the traveler.

In the top of the head 11 is formed a slot 18 extending across the same from side to side through the center. The width of said slot is sufficient to receive, and if desired, permit rotation of the coupling nut A to be mounted on a fitting B, and of a depth to contain slides 19, 20, on which the compressing dies 12, 13 are attached. In one side of the slide 19, is cut a rack 21, the teeth of which are inclined. The other slide has a similar rack 22 with oppositely inclined teeth. Engaging these racks are two screws 23, 24, left and right handed respectively, mounted on a shaft 25 journaled on the head 11 and rotated by any suitable means, such as a crank 26. The dies 12, 13, are fastened rigidly on the top of the respective slides by screws or other means and have semi-circular depressions 27 formed in their inner ends which taper outwardly at equal angles from their undersides, as shown in Figs. 4 and 5. When the dies are brought together by rotating the crank 26 to actuate the screws 23 and 24 and through them the slides 19 and 20, the depressions 27 will form a circular hole with tapering sides lessening in diameter from above downwardly. Through the center of the head 11 is a hole 28 to permit the passage of the upper end of the traveler 14 which terminates in a threaded stud 29 for holding the coupling nut A screwed thereon.

The coupling nut A is of the usual type as will be seen on reference to Fig. 7 and comprises a portion $a$ threaded interiorly and provided with a polygonal exterior for the application of a wrench. Projecting from one side of the polygonal part $a$ is a cylindrical portion $a'$ of less diameter exteriorly than said polygonal part but containing a cylindrical chamber $a^2$ slightly greater in diameter than the threaded portion and provided with an inwardly projecting flange $a^3$ at its outer end.

Before securing the coupling nut on the fitting B, it is made in the shape represented in Fig. 6, the portion $a'$ tapering or flaring outwardly from the part $a$, with the flange $a^3$ at a right angle to the wall of the portion $a'$. The spread of the portion $a'$ is sufficient to permit the flange or collar $b$ on the stem $b'$ of the fitting B to enter through the flange $a^3$ into the chamber $a^2$ of the coupling nut.

The manner of applying the coupling nut on the fitting is to insert the flanged end of the stem of said fitting into the chamber $a^2$ of the nut A while the wall of the portion $a'$ is inclined as shown in Figs. 4 and 6, then by applying exterior pressure simultaneously on all sides of the inclined or flaring wall, and moving or drawing the nut perpendicular to the direction of said pressure, the inclined or flaring wall is gradually straightened until it becomes cylindrical as in Fig. 7, thereby causing the flange $a'$ projecting inwardly from the wall to overlap the flange $b$ on the fitting, and thus prevents the nut from coming off but permits it to rotate and move longitudinally on said fitting within the limit of the chamber $a^2$. From the above it will be clear that the portion $a'$ of the nut is closed around the flange $b$ of the fitting by a primary force acting in line with the axis of the chamber of the nut and not laterally against the wall of said chamber.

The operation of the particular apparatus illustrated is as follows: The crank 26 is rotated in proper direction to separate the dies 12 and 13, and the lever 17 moved to raise the traveler 14 in order to bring the threaded stud 29 above the dies, as in Fig. 2, for the coupling nut A to be screwed thereon. The traveler is then lowered to bring the portion $a'$ of the coupling nut in line with the dies 12 and 13 which latter are then advanced by turning the handle 26, until their semi-circular depressions 27 embrace said portion $a'$, surrounding the same on all sides and snugly fitting against the inclined wall thereof. The stem of the fitting B on which is a flange $b$ usually at the end thereof is now inserted in the flaring end of the nut until said flanged end rests on the stud 29 projecting from the traveler 14, see Fig. 4. The lever 26 is again operated to further lower the traveler 14 and with it the coupling nut, which, it will be remembered, is firmly screwed on the stud 29. The flared end of the nut is drawn through the dies which press its walls inwardly parallel to the axis of said nut and cause the flange $a^3$ thereon to overlie the flange $b$ on the fitting, see Fig. 5, thereby preventing the separation of said parts.

The invention as illustrated in the drawings shows the mechanism operating on a bath cock, but it is to be understood that fittings of other types may have coupling nuts placed and applied thereon by the same or equivalent mechanism.

It is to be understood that this machine may be variously modified provided it retains the spirit of the invention set forth in the accompanying claims.

What we claim is:—

1. In an apparatus of the character described, a support for holding a coupling nut initially formed with an outwardly flaring socket end, a plurality of movable dies having concaved ends adapted to closely embrace on all sides the flared socket end of said nut, and means for forcing said flared socket end of the nut in an axial direction through said dies to change its form.

2. In an apparatus of the character described, a longitudinally movable traveler having means for attaching thereto a coupling nut initially formed with an outwardly flaring socket end having an inturned flange, a plurality of movable dies with concaved ends the walls of which ends flare correspondingly with the flared socket end of the nut, said dies adapted to closely embrace and forcibly bear against said flared socket end on all sides, means for simultaneously moving said dies, and means for moving said traveler axially of said nut to draw the flared end thereof through said dies to change its form.

3. In an apparatus of the character described, a longitudinally movable traveler provided with means for attaching thereto a coupling nut initially formed with an outwardly flaring socket end and having an inturned flange, said traveler also having a supporting surface for one end of a fitting, a plurality of movable slides each carrying a die with a concaved end, the walls of which ends flare correspondingly with the flared socket end of the nut, said dies adapted to closely embrace and forcibly bear against said flared socket end on all sides, a worm operatively engaging each slide and means for rotating said worms in unison for simultaneously moving said dies radially toward and away from said nut to engage with or release the same, and means for moving said traveler axially of said nut to draw the flared end of the nut through said dies to change its form.

4. In apparatus of the character described, means for supporting a coupling nut formed with an initially flared and flanged socket wall, and also a flanged fitting adapted to enter said socket, dies adapted to closely embrace on all sides said flared socket wall, and means for actuating said supporting means and nut for drawing the flared socket through the dies to straighten its wall and cause the flange thereon to overlie the flange on the fitting.

5. In an apparatus of the character described, a longitudinally movable traveler provided with means for holding a coupling nut, a plurality of dies adapted to closely embrace the initially flared socketed end of the coupling nut, and means for applying longitudinal pressure to said coupling nut to draw it through said dies for the purpose of closing said socketed end over a flanged fitting placed therein.

6. In an apparatus of the character described, a longitudinally movable traveler provided with means for holding a coupling nut, a plurality of dies movable transversely to said traveler for closely embracing on all sides the initially flared and interiorly flanged socketed end of said coupling nut, and means for moving said coupling nut in a longitudinal direction to draw it through said dies, whereby the walls of said socketed end are made parallel and the flange thereon forced over the flanged end of a fitting inserted in the socket.

7. In an apparatus of the character described, a longitudinally movable traveler provided with means for holding a coupling nut, a plurality of dies formed with tapering concave ends and movable transversely to said traveler to bring said ends into close contact on all sides of the initially flared and interiorly flanged socketed end of said coupling nut, and means for moving said traveler to draw said coupling nut through said dies to close said flanged socketed end over the flanged end of a fitting placed therein.

In testimony whereof we have hereunto set our hands in presence of two subscribing witnesses.

PHILIP MUELLER.
ANTON C. SCHUERMANN.

Witnesses:
LEONARD F. MCKIBBEN,
WILLIAM R. BIDDLE.

Copies of this patent may be obtained for five cents each, by addressing the "Commissioner of Patents, Washington, D. C."